July 23, 1940.                H. A. JABERG                2,209,274
                         INSULATING BUSHING
                         Filed Nov. 5, 1938
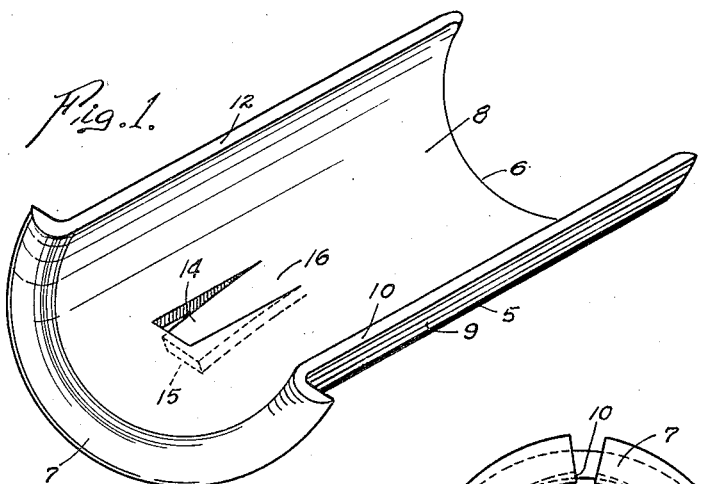
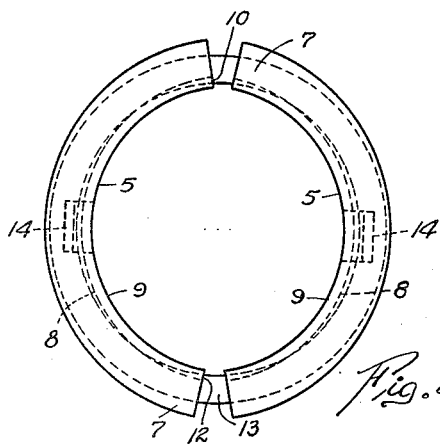
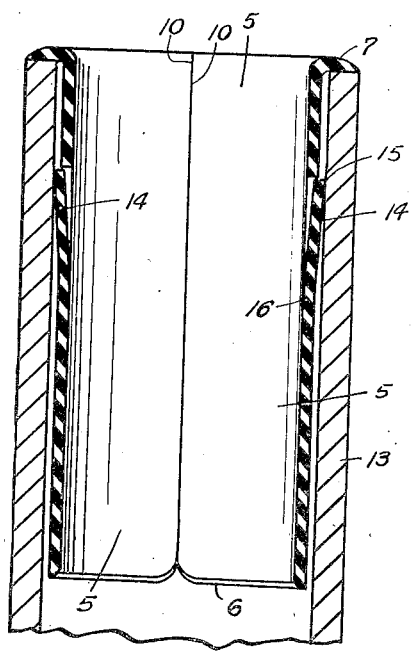
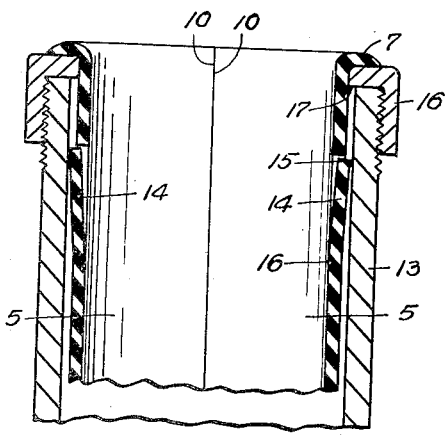
INVENTOR
Howard A. Jaberg
BY Frank Zugelter
ATTORNEY Patented July 23, 1940

2,209,274

UNITED STATES PATENT OFFICE 2,209,274

INSULATING BUSHING

Howard A. Jaberg, Cincinnati, Ohio

Application November 5, 1938, Serial No. 239,093

6 Claims. (Cl. 174—83)

The present invention relates to insulating bushings in electrical installations, and especially to means for effecting a solution of the problems related in my co-pending application for patent filed March 9, 1938, as Serial No. 194,824, and entitled "Electrical installation."

An object of the invention is to provide improved means for maintaining a properly insulated condition of conduits and fixtures such as splice and junction boxes, pull boxes, panel and sub-feeder cabinets, and the like, which are employed in installations that may be required to withstand vibration or movement.

Another object of the invention is to provide an improved bushing means which may be applied or renewed, upon wiring installations, without requiring disassembly of the installation or disturbance of the wiring connections and splices existing therein.

Another object is to provide an improved insulating bushing of multi-part construction, including a simple and effective means of maintaining a desired relationship of the bushing to its conductor or conduit.

Another object is to provide a multi-part insulating bushing which will not pinch or chafe the conductors passing therethrough.

These and other objects are attained by the means described herein and disclosed in the accompanying drawing, in which:

Fig. 1 is a perspective view of one of two identical bushing parts constituting the present invention.

Fig. 2 is a longitudinal cross-sectional view of a conductor tube or conduit element equipped with the insulating bushing structure of the invention.

Fig. 3 is a view similar to Fig. 2, showing application of the bushing structure to a different type of tube or conduit.

Fig. 4 is an end view of a tube or conduit, and a pair of bushing elements placed in position preparatory to being contracted radially for insertion into the tube or conduit. The view shows the desired differences in radius, of the bushing parts and the tube or conduit.

As is explained more fully in my co-pending application aforesaid, it is necessary to properly protect electrical conductors against short-circuiting or grounding upon the conduit or conductor tube in the event of chafing or wearing away of the conductor insulation resulting from movement or vibration of the conductors within the tubes or conduits. This wearing or chafing of the insulation occurs most frequently at or near the cabinet, junction box, or other fixture into which the electricity conductors are led from the tube or conduit. The danger is especially in evidence where the conductors or cables are necessarily bent or curved where they emerge from the tube or conduit to enter one of the fixtures previously mentioned. It is at this point that the problem of effective insulation arises, in electrical installations of the character mentioned. The problem is especially acute in industrial installations, and in those wherein the conductors are subjected to vibration or other movement or shifting known as breathing.

It should here be noted that, in the instant disclosure, it is immaterial whether the tube or conduit be of one kind or another, and the manner of connecting same to a box, panel, or other fixture likewise is immaterial to the present invention. It is accordingly deemed unnecessary to duplicate all of the drawing and description of my co-pending application, Serial No. 194,824.

With reference to the accompanying drawing, 5 indicates the body of an insulating bushing element, which may be constructed of fiber or other known insulating material. The body 5 has a leading end 6 and a flanged end 7, an inner concave surface 8, and an outer convex surface 9. The straight edges of the body, which bound the convex and concave surfaces along their length, are indicated by the characters 10 and 12. The edges 10 and 12 are adapted to closely abut the corresponding edges of a second similar bushing element as shown in Figs. 2 and 3, when two such bushing elements are inserted in the end of a conductor tube or conduit 13, thereby to form a smooth and continuous insulating lining within the tube or conduit, without overlapping areas, or spaces, to chafe or pinch the conductors or cables that pass therethrough. The smooth flanged end 7 and the chamfered leading end 6 of each bushing element likewise avoids any possibility of chafing or pinching of the conductors or cables.

At a location intermediate the ends 6 and 7, the body 5 has struck from the material thereof, a tongue or lug 14 having a free end 15 and an anchored end 16. The free end 15 is pressed outwardly from the convex face 9 of the body, and such pressed or extended condition thereof is the normal condition of the tongue or lug before insertion of a pair of bushing elements into the tube or conduit. The material of the body 5 is inherently resilient, so that the lug or tongue likewise bears that characteristic, with the result that it is capable of frictionally and yieldingly abutting the inside of the tube or conduit, to oppose any tendency of the bushing element to shift therein. Another important function of the yielding lugs or tongues 14 is to induce a tight line-contact between the corresponding edges 10 and 12 of the bushing pairs when inserted into the tube or conduit, (see Figs. 2 and 3). The lugs or tongues 14 have a third function when the bushings are used in conjunction with a conduit or other conductor casing capped with a flanged ring or ferrule such as 16, this being to preclude withdrawal of the bushing elements from the tube or conduit by reason of the tongue or lug engaging the inner edge of the flange at 17, upon attempted or accidental limited shifting of the bushing elements outwardly of the tube or conduit 13. Accordingly, it is preferable that the free end 15 of the tongue or lug be directed toward the flanged end 7 of the bushing element. By preference, though not of necessity, the tongue or lug is made integral with the body 5, by reason of its being struck therefrom in a press operation or otherwise. The tongue or lug could of course be a separate resilient part suitably mounted upon the convex outer face of the body 5.

In the preferred form of the invention, the bushing element is a segmental part of a hollow cylinder, which segmental part is less than a half cylinder, so that contraction or squeezing thereof to a smaller diameter is necessary to make it a substantial half cylinder and to enable fitting two of such bushing elements into a tube or conduit of a given diameter. The differences of the radial dimensions of the conduit and the bushing elements are indicated in Fig. 4, showing that squeezing or contraction of the bushings is necessary to fit them into the conduit or tube 13. When the bushings are thusly forced into the open end of the tube or conduit, the resiliency of the bushing bodies, and the friction and resiliency of the lugs or tongues 14, cooperate to maintain the bushing elements in position with their corresponding edges 10 and 12 tightly abutting, as in Figs. 2 and 3.

Due to the bi-part construction of this insulating bushing, it should be evident that the conduit or tube may be bushed effectively all around its inner wall even in the presence of wires or cables passing therethrough; that is, the bushing elements may be applied to the conduit or conductor tube without the disconnecting of any conductors that may extend from the tube end. The application of bushings as disclosed herein is greatly superior to the use of circular or spiral one-piece bushings which might overlap or shift their positions and thereby defeat the attempt to preclude chafing and wearing of the conductor insulation. The bushing means of the present invention embodies a strong and lasting resistance to displacement, and is of a permanent character. The substantial thickness of material used in forming the body 5 obviously cannot be employed in the well known one-piece spiral form of bushing, which must necessarily be made sufficiently thin and flexible to enable substantial distortion thereof to receive cables or other conductors. Bushings which are required to submit to such substantial distortion cannot be made heavy enough to perform properly as an insulating bushing in any of the larger conduit sizes. It should therefore be understood that the insulating bushing means of this invention is not in the category of the small and thin one-piece bushings commonly used in armored cable and the like.

What is claimed is:

1. In combination, a rigid pipe-casing for electricity conductors, having an end opening and a substantially smooth inner surface, a bipart bushing within the open end of the casing, and comprising two resilient bodies each having a leading end and a flanged end, a concave inner face, and a convex outer face, the configuration of the body being substantially that of a hollow cylinder segment of lesser extent than a half-cylinder and formed on a radius greater than the radius of the inside diameter of the casing, so that upon contraction of each segment to a size receptive in the casing the segments will be converted into half-cylinders of a radius approximating that of the casing interior, and a friction lug on each body extending lengthwise thereof and at a slight angle thereto for the purpose of flatwise slidability along the smooth interior of the casing, said lugs each including a free end directed toward the flanged end of the bushing part substantially axially of the surrounding casing.

2. In combination, a rigid pipe-casing for electricity conductors, having an end opening and a substantially smooth inner surface, a bipart bushing within the open end of the casing, and comprising two resilient bodies each having a leading end and a flanged end, a concave inner face, and a convex outer face, the configuration of the body being substantially that of a hollow cylinder segment of lesser extent than a half-cylinder and formed on a radius greater than the radius of the inside diameter of the casing, so that upon contraction of each segment to a size receptive in the casing the segments will be converted into half-cylinders of a radius approximating that of the casing interior, and a friction lug on each body extending lengthwise thereof and at a slight angle thereto for the purpose of flatwise slidability along the smooth interior of the casing, said lugs each including a free end directed toward the flanged end of the bushing part substantially axially of the surrounding casing, and means on the casing end for imposing an endwise compressive force longitudinally of the lug upon shifting of the bushing toward the open end of the casing.

3. In combination, a rigid pipe-casing for electricity conductors, having an end opening and a substantially smooth inner surface, a ferrule including an inwardly turned annular flange and cooperative means on the casing and the ferrule for mounting of the ferrule upon the casing end with the flange overlying the casing end, the inner diameter of the annular flange being less than the inside diameter of the casing, so that the flange overhangs and partially obstructs the end opening of the casing, a bipart insulating bushing for lining the casing at the open end thereof, the parts of the bushing each consisting of a cylinder segment less than a half-cylinder, preformed of firmly resilient insulating material on a radius exceeding the established radius of the rigid casing interior, whereby each bushing part is independently frictionally supported by an expansion force between its longitudinal edge margins and the smooth rigid wall of the casing after temporary contraction of the bushing part sufficiently to enter the open end of the casing, an outwardly turned flange on one end of each bushing part adapted to overlie the flange of the ferrule, and a resilient lug struck from the material of each bushing part at a location closer to the flange than to the oposite end of the bushing part with the free end of the lug lying close to the bushing part and extended toward the flange, said lug having an extensive area for frictionally contacting the casing interior and constantly urging the bushing part away from the interior of the casing, the free end of said lug being slidable along the casing interior and engageable with the ferrule flange to preclude withdrawal of the bushing part from the casing end.

4. In combination, a rigid pipe-casing for electricity conductors, having an end opening and a subtsantially smooth inner wall, a flanged ring constricting the end opening of the casing, a bipart insulating bushing for lining the casing near the open end thereof, the parts of the bushing each consisting of a cylinder segment less than a half-cylinder, of firmly resilient insulating material pre-formed on a radius exceeding the established radius of the rigid casing interior, whereby each bushing part is independently frictionally supported by an expansion force between its longitudinal edge margins and the smooth inflexible wall of the casing after temporary contraction of the bushing sufficiently to enter the open end of the casing, each bushing part along its longitudinal edge being of such thickness as to afford longitudinal edge faces of substantial width on each bushing for effecting a stable butt joint between adjacent longitudinal edges of the complementary bushing parts, an outwardly turned flange on each bushing part overlying the flanged ring on the end of the casing, and a resilient lug extending substantially flatwise along the exterior of each bushing part and having a free end projecting toward the bushing flange, the angularity between the bushing exterior and the lug being slight so that the lug rests approximately in face contact upon the smooth interior of the casing, thereby being slidable thereon, while at all times resiliently maintaining a constant force at the butt joint aforesaid, the free ends of the lugs being compressible lengthwise against the flanged ring of the casing upon shifting of the bushing parts outwardly of the casing end.

5. In combination, a rigid pipe-casing for electricity conductors, having an end opening and a substantially smooth inflexible interior wall, a bipart insulating bushing for lining the casing near the open end thereof, the parts of the bushing each consisting of an approximate half-cylinder of firmly resilient insulating material pre-formed on a radius exceeding the established radius of the rigid casing interior, whereby each bushing part is independently frictionally supported by an expansion force between its longitudinal edge margins and the smooth inflexible wall of the casing after temporary contraction of the bushing part sufficiently to enter the open end of the casing, each bushing part along its longitudinal edge being of such thickness as to afford longitudinal edge faces of substantial width on each bushing for effecting a stable butt joint between adjacent longitudinal edges of the complementary bushing parts, the wide edge faces of the bushing parts and the inflexibility of the casing cooperating to overcome any tendency of the bushing parts to overlap within the casing.

6. In combination, a rigid pipe-casing for electricity conductors, having an end opening and a substantially smooth inflexible interior wall, a bipart insulating bushing for lining the casing near the open end thereof, the parts of the bushing each consisting of an approximate half-cylinder of firmly resilient insulating material, and having an end including a flange and an opposed leading curved end smoothly chamfered along its concaved inner edge, the latter having extremities rounded so as to preclude injury to an object contacted thereby, the flange of said one end being disposed laterally to the axis of the bushing part, said bushing parts each being preformed on a radius exceeding the established radius of the rigid casing interior, whereby each bushing part is independently frictionally supported by an expansion force between its longitudinal edge margins and the smooth inflexible wall of the casing after temporary contraction of the bushing part sufficiently to enter the open end of the casing, each bushing part along its longitudinal edge being of such thickness as to afford longitudinal edge faces of substantial width on each bushing for effecting a stable butt joint between adjacent longitudinal edges of the complementary bushing parts, the wide edge faces of the bushing parts and the inflexibility of the casing cooperating to overcome any tendency of the bushing parts to overlap within the casing.

HOWARD A. JABERG.